United States Patent

Rudd

[15] 3,648,005
[45] Mar. 7, 1972

[54] INDUCTION TUBE WELDING WITH IMPROVED CURRENT PATH
[72] Inventor: Wallace C. Rudd, Larchmont, N.Y.
[73] Assignee: AMF Incorporated
[22] Filed: Aug. 28, 1970
[21] Appl. No.: 67,841

[52] U.S. Cl. .................................219/8.5, 219/59, 219/102
[51] Int. Cl. .......................................................H05b 5/00
[58] Field of Search....................218/8.5, 9.5, 10.43, 59, 64, 218/67, 101, 102, 104, 107

[56] References Cited

UNITED STATES PATENTS

| | | | |
|---|---|---|---|
| 2,886,691 | 5/1959 | Rudd | 219/67 |
| 2,938,993 | 5/1960 | Rudd | 219/8.5 X |
| 1,806,952 | 5/1931 | Richter | 219/102 X |
| 3,037,105 | 5/1962 | Kohler | 219/8.5 |

FOREIGN PATENTS OR APPLICATIONS

| | | | |
|---|---|---|---|
| 1,203,894 | 10/1965 | Germany | 219/8.5 |
| 1,219,142 | 6/1966 | Germany | 219/8.5 |

Primary Examiner—J. V. Truhe
Assistant Examiner—L. A. Schutzman
Attorney—George W. Price and John H. Gallagher

[57] ABSTRACT

Welding current path is restricted to immediate regions of edges of open tube by use of bodies of magnetic material placed on respective sides of V-shaped gap in region between weld point and induction coil. Each body has an edge closely adjacent, but spaced from, edge of tube, and a second edge closely adjacent induction coil. Magnetic bodies are fabricated from short rods of ferrite material secured together in bundles in a manner to leave a plurality of substantially uniformly distributed void spaces extending through the bodies in direction transverse to tube. Fluid coolant is passed through void spaces to keep temperature of ferrite material below its Curie temperature. Magnetic bodies could be molded as unitary blocks with cooling passages molded therein.

7 Claims, 7 Drawing Figures

Patented March 7, 1972

3,648,005

INVENTOR
WALLACE C. RUDD
BY
John H. Gallagher
ATTORNEY

INVENTOR
WALLACE C. RUDD
BY
John H. Gallagher
ATTORNEY

Patented March 7, 1972 3,648,005

INVENTOR
WALLACE C. RUDD
BY
John H. Gallagher
ATTORNEY

INDUCTION TUBE WELDING WITH IMPROVED CURRENT PATH

BACKGROUND OF THE INVENTION

The fabrication of tubing and small diameter pipe by the high frequency induction welding method has been carried out commercially for a number of years. In this method, metal strip material is passed through shaping rolls to impart a C-shaped cross-sectional configuration to the strip, and the edges of the strip are brought together at a desired weld point by a set of squeeze rolls to from the closed tubular configuration. An induction coil of one or more turns surrounds the tube at a region in advance of, i.e., upstream of, the weld point where the edges are slightly displaced from each other. The coil is connected to a source of AC current having a frequency which may range from 10 to 500 kiloHertz, for example. The high frequency current that is induced into the tube by the coil ideally flows on the outer surface around the back side of the open tube, then along one edge thereof to the weld point, then finally from the weld point along the opposite edge to the circumferential region under the coil. For the most efficient heating of the edges prior to their arrival at the weld point, the full welding current should flow along the adjacent edges for the entire distance between the induction coil and the weld point.

It was discovered early in the development of the art that the full welding current did not flow along the entire lengths of the adjacent edges in the desired manner. The consequence of this is that a current generator of larger current rating must be used, and/or the speed of travel of the tubing through the welding apparatus must be slower that contemplated, based on theoretical considerations. In U.S. Pat. 2,716,689 it is postulated that a significant portion of the welding current flows on the outer surface of the tube in the circumferential direction around the back side thereof in the region between the coil and the weld point, much in the same manner as it does directly under the induction coil. Obviously, this current would not efficiently heat the tube edges. Subsequent investigation has shown that the current flow as postulated in said patent is rather inconsequential and that the major loss of heating current from the edges of the open tube arises from the fact that, when looking in the direction from the weld point to the induction coil, the current progressively departs from the edges and flows on the outer surfaces along the sides of the tube to the region under the coil where it then follows the circumferential path around the back side of the tube.

What is believed to be an accurate representation of the path of current flow on the outer surface of the tube in a basic high frequency induction tube welding system having no current guiding means is illustrated in FIG. 1 of the attached drawings. The metal strip has been formed into the shape of an open tube 10 wherein the edges 11 and 12 are separated by a V-shaped gap. Squeeze rolls 16 and 17 force the edges into butting relationship at a desired weld point w. An induction coil 20 is coupled to a source 21 of AC current whose frequency may range between 10 to 500 kiloHertz. The current induced in tube 10 by coil 20 flows on the outer surface around the bottom, or back side of tube 10 in the region under coil 20. On the top side of tube 10 the current path takes on longitudinal components of direction to pass around weld point w where the two edges join. As illustrated, the current begins to progressively divert from the two edges as the generally longitudinally directed portions of the current path progressively move away from weld point w on both sides of the gap. Looking at the lines 22 and 23, for example, current flowing along these lines will be effective to heat only the portions of edges 11 and 12 at, and immediately adjacent, the weld point w and will have no significant heating effect on the remaining portion of edges 11 and 12 up to coil 20. Obviously, more efficient heating may be achieved if the current represented by lines 22 and 23, for example, were to flow along the edge 12 for substantially the entire distance between weld point w and coil 20.

FIG. 2 is a representation of the desired current path for optimizing the heating effect of the welding current. As illustrated, the generally longitudinal portions of the current path are substantially confined to the two edges of the open tube and the path makes sharp turns to extend circumferentially around the tube under the induction coil.

The previously mentioned art proposed to accomplish the desired result mentioned above, but because of the misconception as to the current path, ti was believed necessary to surround the tube, except for the region at the edges of the V-shaped gap, with magnetic material. As is known, the magnetic material causes the high frequency current flowing on the outer surface of the tube to "see" a high impedance, thus causing the current to preferentially flow along the edges of the gap where the impedance is lower. However, because there is not significant current flow in the circumferential direction between the weld point w and the immediate region of coil 20, magnetic material on the back side of the tube will have very little effect to achieve the desired result and therefore is largely wasted. The region where magnetic material is required is near the edges of the open tube and near the coil in regions adjacent the edges. During the operation of the welding system, material located in these regions is subjected to very high temperatures in the range of 1,700° to 2,500° F., for example. These temperatures are far in excess of the Curie temperatures of magnetic materials such as ferrites which are preferred for use. Therefore, effective means must be provided to cool the magnetic material to maintain it below its Curie temperature. Ferrite materials are quite brittle and are difficult to drill and bore. It therefore is difficult to machine fluid passages therethrough for cooling them. Additionally, if the ferrite material is subjected to a considerable temperature differential, it will easily crack and shatter. For this reason, the material must be uniformly cooled.

BRIEF SUMMARY OF THE INVENTION

I have overcome the above difficulties by providing bodies of ferromagnetic material each of which is fabricated of relative thin round ferrite rods that are secured together in parallel relationship to form a bundle. Each bundle has a shape in a plane that passes transversely through the rods so as to provide one edge which may be placed along, but slightly spaced from, an edge of the open tube, and a second edge that extend substantially parallel to, and slightly spaced from, the induction coil. A magnetic body is positioned on each side of the V-shaped gap and each body extends longitudinally at least one-half the distance between the induction coil and the weld point, and extends circumferentially less than 90° around the tube.

Because of the shape and location of the magnetic bodies on or adjacent the surface of the tube, the path of the welding current in the longitudinal direction on the tube is substantially restricted to the immediate region of the edges of the open tube. Because the ferrite rods that comprise a magnetic body are joined together in parallel relationship, void spaces naturally will exist along the lengths of adjacent rods and substantially uniformly throughout a bundle of rods. A fluid coolant may be passed through the void spaces between the rods to substantially uniformly cool the body and maintain it below its Curie temperature.

DESCRIPTION OF THE PREFERRED EMBODIMENT

Figure 1:
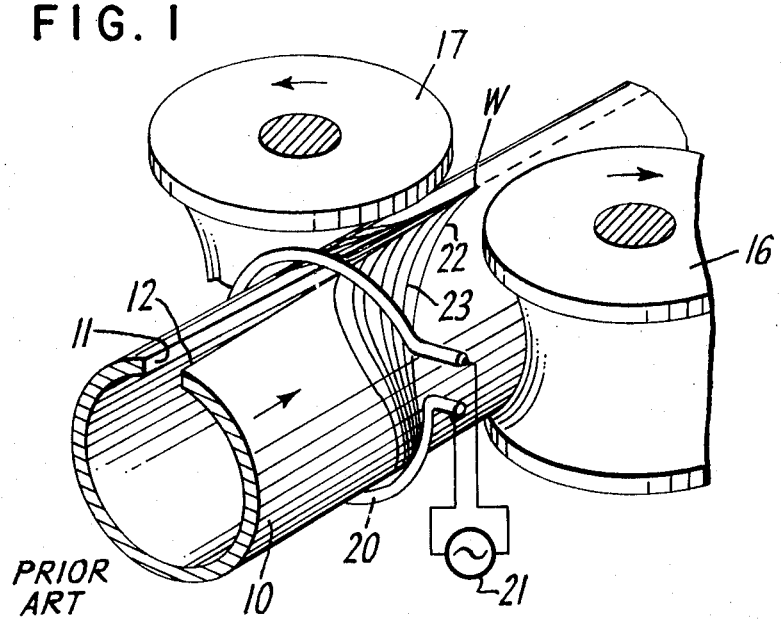
FIG. 1 is an illustration of the basic structure and current path of the prior art high frequency induction welding method which has been described above.
Figure 2:
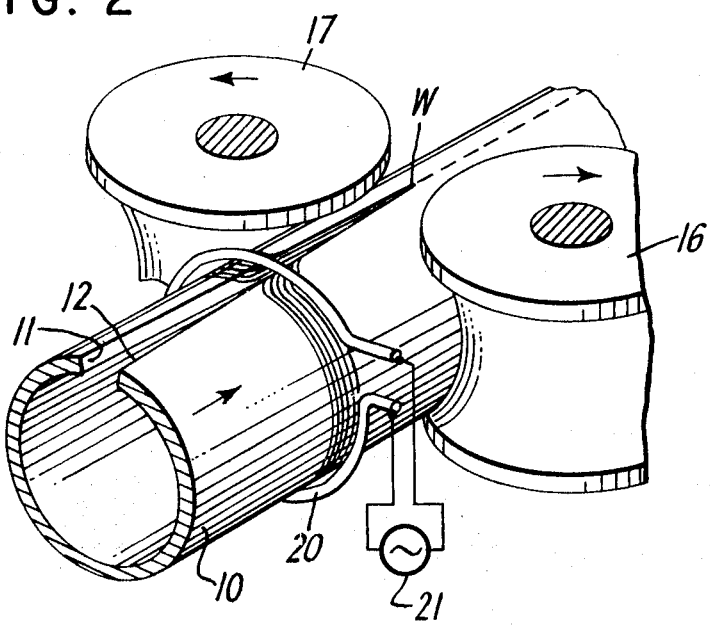
FIG. 2, as mentioned above, illustrates the desired current path to optimize the heating effect of the welding current in high frequency induction welding.
Figure 3:
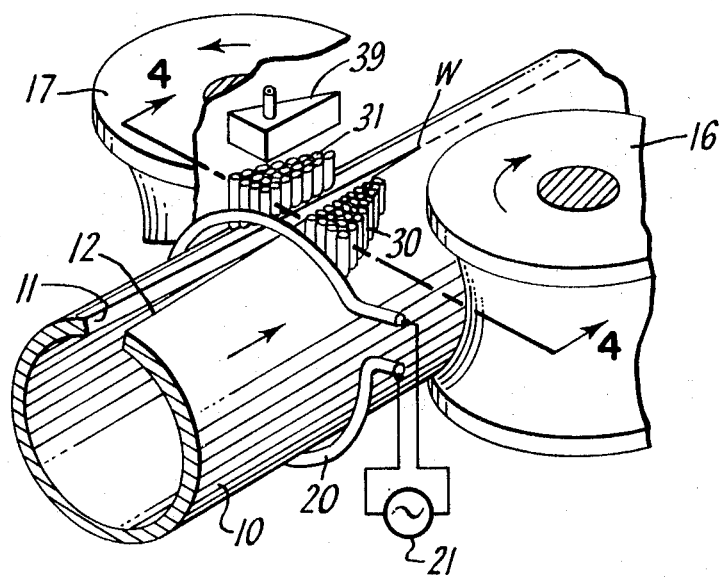
FIG. 3 is a simplified perspective illustration showing the current guiding magnetic bodies of this invention.
Figure 4:
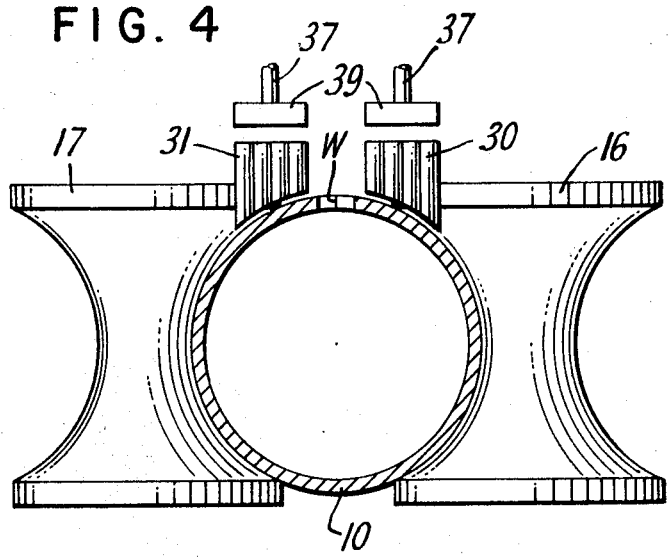
FIG. 4 is a sectional view taken at section 44—4 of FIG. 3.

Referring to FIG. 3, the basic welding apparatus illustrated therein is substantially the same as in FIGS. 1 and 2 and the same reference characters are used as in those previous Figures. In accordance with this invention, current guiding magnetic bodies 30 and 31 are placed adjacent the opposite edges 11 and 12 in the region between induction coil 20 and weld point $w$ to cause the welding current to follow a path substantially as illustrated in FIG. 2 wherein the longitudinally extending portions of the path are substantially confined to the edges 11 and 12 along substantially the entire distance between coil 20 and weld point $w$. Each magnetic member 30 and 31 is comprised of a bundle of ferrite rods arranged in parallel relationship with their axes intersecting the outer surface of tube 10. The rods may be secured together with an epoxy cement and/or one or more nonmagnetic straps extending around the bundle. As best seen in FIG. 4, the bottom surface of each bundle 30 and 31 is slightly spaced from the surface of tube 10 and is contoured to substantially conform to the contour of the outer surface of the tube. The bottom surfaces of the magnetic members may be shaped by grinding to form a smooth contour. Alternatively, the contoured bottom surface of a bundle may be formed during assembly by placing a loose bundle of rods on the surface of the tube 10 so that the bottom of each rod rests on the tube. The rods then are held fixed with respect to each other and secured together. Although the bottom surface of each rod is flat, collectively the bottom ends of the rod take on the contour of tube 10. The top surface of the bundle then may be ground flat, or to any other desired shape. Irrespective of the method of fabricating the bundles, desirably they are mounted in slightly spaced relationship from the surface of tube 10, as illustrated in FIG. 4.

The rods in the bundles may be arranged so that they are vertical, as illustrated in FIG. 4, or they may be arranged radially relative to the tube 10. Any suitable arrangement may be used for supporting magnetic bodies 30 and 31.

As an example in the manufacture of 3-inch tubing, the magnetic bodies were made from 3/16-inch diameter ferrite rods, with anywhere from 15 to 20 rods in a triangular shaped bundle. The magnetic bodies 30 and 31 are triangular in shape in order that their downstream edges may fit in the regions closely adjacent rolls 16 and 17. The height of a body should be at least one-half inch to facilitate handling and working therewith. Operationally, the height is not critical. I have successfully used a ferrite product sold under the brand name Ferramic H by Indiana General Corporation, Keasbey, New Jersey. The rods may be round, as illustrated, or any other shape as commonly supplied. Additionally, the magnetic bodies may be fabricated from bundles of other types of magnetic materials so long as they exhibit high resistivity and high permeability at the frequency of the welding current.

The size and location of the magnetic bodies are chosen to achieve optimum current flow in the immediate regions of edges 11 and 12. The conditions that determine current flow will vary with different size tubing and with different materials and are best determined empirically. As an example of the arrangement of magnetic bodies with respect to 3-inch tubing, one edge of a magnetic body was spaced approximately one thirty-second inch from a respective edge 11 or 12, and a second edge of each body was as close as possible to the induction coil 20, allowance being made for movement of the tubing as it passes through the apparatus. Ideally, the angle between the above-mentioned edges of the magnetic bodies should be 90° plus the included angle between the edges of the tubing as measured at the weld point, which usually is several degrees. Each bundle extends longitudinally along an edge a distance that is at least one-half the distance between coil 20 and weld point $w$.

Magnetic members 30 and 31 are located in regions of high temperatures which might range between 1,700° and 2,500° F. In order that magnetic bodies 30 and 31 function to perform their intended current guiding functions, they must be cooled below the Curie temperature of the material, which typically may be somewhere around 300° F. Because the magnetic bodies have been fabricated from the round ferrite rods disposed in parallel relationship, void spaces, or passages, naturally exist uniformly throughout each body. As illustrated in FIG. 4, a fluid coolant, such as a soluble mill oil, water, or air, may be directed onto the tops of bodies 30 and 31 by means of fluid conduits 37 and distributing heads 39, all of which preferably are made of nonmagnetic material. The distributing heads 39 are shaped to distribute the fluid coolant onto the tops of magnetic bodies 30 and 31 in such a manner as to substantially uniformly cool the bodies. The coolant will flow through the void spaces between the rods and will discharge from the bottom of the bodies onto the sides of tube 10, thus uniformly cooling the bodies.

Figure 5:
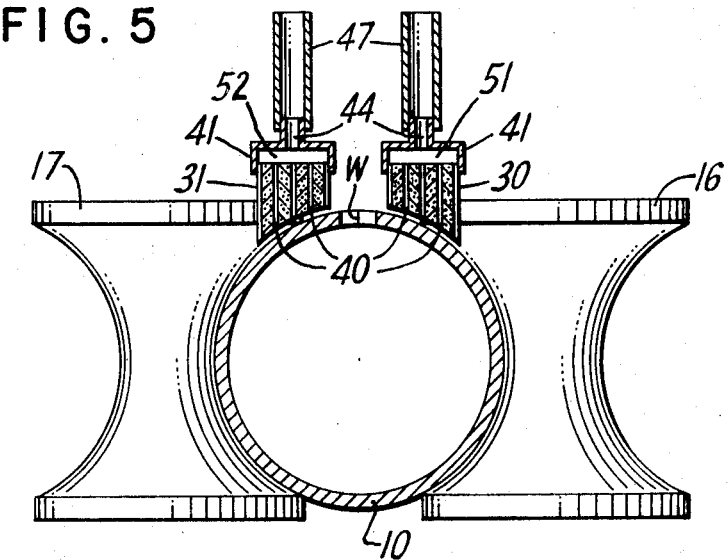
FIG. 5 is an illustration, partially in section, of an alternative arrangement for providing a fluid coolant to cool the magnetic bodies.

An alternative arrangement for cooling the magnetic bodies 30 and 31 is illustrated in FIG. 5. In this drawing the magnetic bodies 30 and 31 are shown in a sectional view, the section having been taken through a vertical plane which passes through a row of rods beyond their centers, thus showing the void spaces 40. On top of each of the magnetic members is a respective header, or cap, 41 and 42 which fits over, and is secured to, the tops of the ferrite rods. The headers are made from a nonmagnetic material such as copper or plastic and each has a fluid port 44 to which a fluid conduit 47 is connected. Headers 41 and 42 provide respective enclosed chambers 51 and 52 above the top ends of the ferrite rods. Fluid coolant is passed through conduits 47 and floods the chambers 51 and 52. Coolant then passes through void spaces 40 and discharges onto the side of tube 10.

Figure 6:
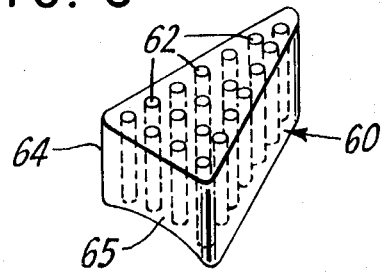
FIG. 6 is an illustration of an alternative construction of a magnetic body of this invention.

An alternative construction of a magnetic body is illustrated in FIG. 6. Instead of the body being constructed from a bundle of parallel circular rods, the body 60 is a unitary molded block of ferrite material having the void spaces 62 molded therein to permit the flow of a fluid coolant through the body. The edge surfaces 64 and 65 would be disposed on a tube slightly spaced, respectively, from an edge 11 or 12 of the V-shaped groove and from the induction coil 20. If desired, a header, or cap, similar to header 41 of FIG. 5 would be provided on the top of body 60 to distribute the fluid coolant to void spaces 62. Block 60 is molded so that its bottom surface has a contour substantially the same as the outer surface of the tube being welded.

In U.S. Pat. 3,171,940 it is shown that the induction coil may be positioned within the open tube instead of being positioned about the tube as illustrated in the drawings described above. The principles of the present invention are equally applicable to the alternative arrangement having the induction coil on the inside of the tube.

Figure 7:
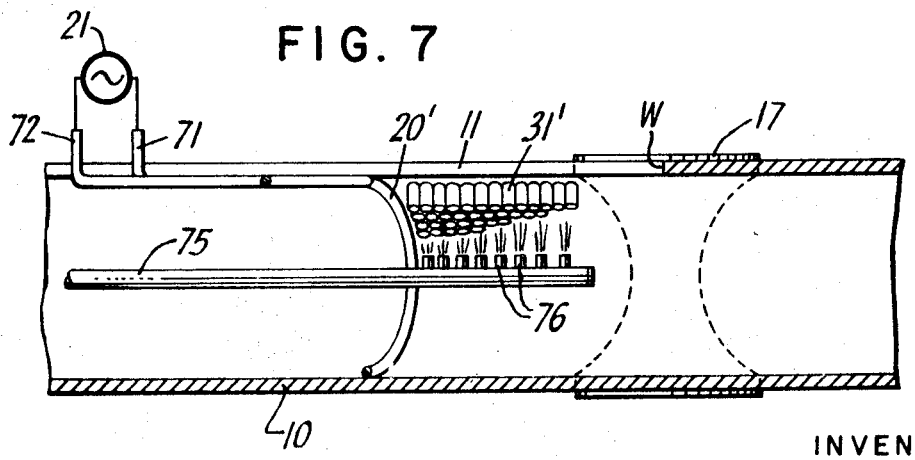
FIG. 7 is an illustration of induction welding apparatus employing the present invention wherein the induction coil and magnetic bodies are positioned on the inside of a tube being formed.

As seen in FIG. 7, induction coil 20' is positioned within the tube 10 and is connected by water colled leads 71 and 72 to the source of high frequency current 21. The current path established in tube 10, in the absence of the magnetic bodies of this invention, would be similar to that illustrated in FIG. 1, except that the current flow around the back side of the tube 10 would be on the inside surface instead of on the outside surface. In accordance with this invention, two magnetic bodies 30' (not illustrated) and 31' are positioned proximate the inside surface of the tube adjacent the edges 11 and 12 (not illustrated), and adjacent coil 20' with substantially the same spacings as described previously in connection with FIG. 3. As illustrated, magnetic body 31' is fabricated from a bundle of short, round ferrite rods secured together, as with epoxy cement, in a manner to provide a plurality of substantially uniformly distributed void spaces throughout the body. Fluid coolant is passed through a centrally disposed conduit 75 of nonmagnetic material and is sprayed from nozzles 76 onto the bodies and into the void spaces therein. If desired, headers similar to those illustrated in FIGS. 3–6 may be employed. The magnetic bodies could be molded unitary blocks, as described in connection with FIG. 6.

The top surface of magnetic body 31' is contoured to substantially conform to the inner surface of tube 10. Suitable supporting apparatus will maintain the magnetic bodies in slightly spaced relationship to the inner surface of tube 10.

In operation, the magnetic bodies of FIG. 7 will function to restrict the welding current path to the immediate regions of the edges of the tube and to the circumferential region immediate adjacent coil 20', with the path making abrupt turns at the corners of the magnetic bodies, substantially as described above.

In the discussion above it has been assumed that the frequency of the welding current is sufficiently high so that the depth of penetration of the current, due to skin effect, is less than the thickness of the tube wall. It is in this context that the discussion has referred to current on the outer surface and on the inner surface of tube 10.

In high frequency induction welding with the same frequency and wall thickness relationships mentioned immediately above, there is an undesirable circumferential current flow on the inner surface of the tube. It is known in the prior art to minimize this inner current by placing a longitudinally extending rod, or rods, of magnetic material within the tube. The rod, or rods, have become known in the art by the name impeder. It should be understood that an internal impeder will have substantially no effect of the current flowing on the outer surface of the tube, and vice versa.

Although the above discussion describes the invention in connection with high frequency induction tube welding, it is not so limited in its use and may be practiced in other arrangements where an edge is to be welded to some other weldable portion which might be something other than the edge of a tube.

What is claimed is:

1. In high frequency induction welding apparatus for welding together the longitudinally extending edge portions of an open seam of a tubular member, wherein the edge portions are in conductive contact at a weld point and are heated by means of high frequency current induced by an induction coil that is adjacent to and circumferentially disposed relative to a surface of the tubular member at a location in advance of the weld point, said high frequency current flowing along the respective edge portions to and from the weld point and then flowing on said surface in a circumferential path around the back side of the member, but said current progressively departing from the edge portions in the direction from the weld point to said coil, means for causing the current to flow along said portions between the coil and weld point without substantially departing from the immediate region of said edge portions, comprising first and second bodies of ferromagnetic material located between the coil and weld point, said bodies being disposed closely adjacent said surface on respective sides of the open seam, each body having a first edge portion extending adjacent a respective edge portion of the tubular member but being noncoincident therewith, each of said bodies having a second edge portion closely adjacent said coil and extending circumferentially about said surface of the tubular member an angular extent not exceeding approximately 90°, the first and second edge portions of each body intersecting at an angle that establishes the desired path of current flow from an edge portion of the tubular member to said circumferential path, a plurality of void spaces extending through the bodies for passing a fluid coolant therethrough to maintain said bodies below their respective Curie temperature when said current is flowing.

2. The combination claimed in claim 1 wherein said bodies of ferromagnetic material each is comprised of a plurality of ferrite rods bundled together in parallel relationship in a manner to provide a plurality of substantially uniformly distributed void spaces therebetween, said ferrite rods arranged with their axes intersecting said surface of the tubular member, one end of each bundle of rods being shaped to substantially conform to the curvature of the tubular member in the region between the coil and weld point, each bundle being positioned with its respective shaped end slightly spaced from said surface of said tubular member.

3. The combination claimed in claim 7 wherein each bundle of rods is approximately triangular in configuration taken through a plane transverse to the axes of the rods.

4. The combination claimed in claim 7 and further including a cap member fixed to the end of each bundle opposite said shaped end, means for passing a fluid coolant through said cap member to distribute said coolant to all of said void spaces, thereby providing means for substantially uniformly cooling said magnetic bodies.

5. The combination claimed in claim 2 wherein said induction coil and bodies are disposed adjacent the outer surface of the tubular member.

6. The combination claimed in claim 2 wherein said induction coil and bodies are disposed adjacent the inner surface of the tubular member.

7. The combination claimed in claim 2 wherein said bodies are each unitary molded blocks of ferrite material having a plurality of substantially uniformly distributed void spaces extending therethrough.

* * * * *